J. R. MARSICO.
MECHANICAL HORN.
APPLICATION FILED OCT. 2, 1915.

1,237,074.

Patented Aug. 14, 1917.

Witnesses
A. V. Doyle.
James A. Kahl

Inventor
J. R. Marsico,
By Victor J. Evans
Attorney

UNITED STATES PATENT OFFICE.

JERARD R. MARSICO, OF BROOKLYN, NEW YORK.

MECHANICAL HORN.

1,237,074.     Specification of Letters Patent.     Patented Aug. 14, 1917.

Application filed October 2, 1915. Serial No. 53,795.

*To all whom it may concern:*

Be it known that I, JERARD R. MARSICO, a subject of the King of Italy, residing at Brooklyn, in the county of Kings and State of New York, have invented new and useful Improvements in Mechanical Horns, of which the following is a specification.

This invention relates to mechanical signaling horns or like sounding devices.

An object of the invention is to provide a mechanical sounding device of this character which will consist of a flexible diaphragm and a vibrating mechanism including a means for positively driving the same in the presence of and against the diaphragm and then in turn permitting the vibrating means to operate under inertia against the diaphragm.

Another object of the invention resides in the provision of a sounding device including a flexible diaphragm and revolving vibrating means including a structure which will serve to properly balance the vibrating means and thereby increase the general efficiency of the same while in operation.

In the drawings:—

Figure 1:
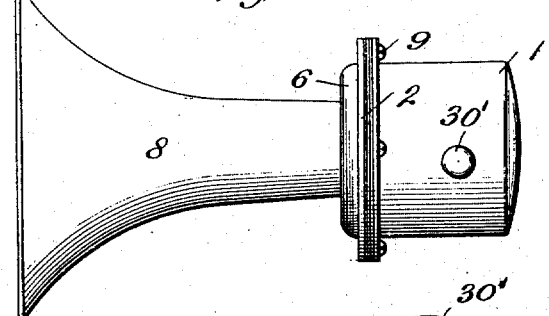
Figure 1 is a plan view of the sounding device.

In carrying the invention into practice, use is made of a casing 1 having a flange 2 to which a flexible diaphragm 3 is secured and arranged with portions respectively interposed between yieldable washers 4 and 5 which operate to take up objectionable metallic vibrations at the point of connection of the diaphragm with the casing 1. Located in advance of the diaphragm is a horn carrying crown or disk 6 having a central collar 7 to which the restricted end of a flared horn 8 is suitably secured. The crown is secured to the flange 2 by suitable fastening screws or the equivalent thereof as shown at 9.

Figure 3:
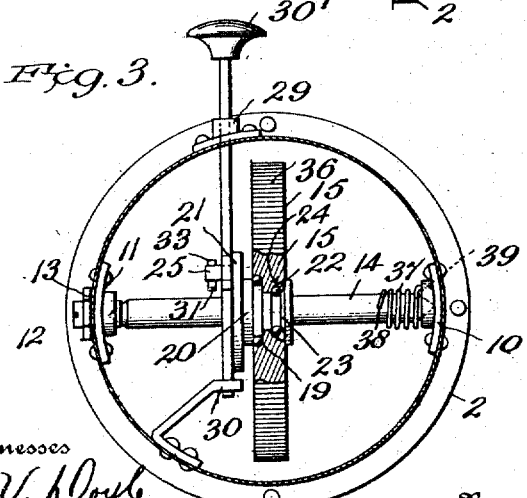
Fig. 3 is a transverse section therethrough.

At diametrically opposite points upon the casing 1 are relatively adjustable bearings 10 and 11, the latter being provided with a screw 12 which may be moved in the direction of the opposite bearing 10 as the occasion may demand. Any requisite adjustment of the screw may be retained by providing the latter with a jam nut 13 which may be securely brought into purchase with the external walls of the casing 1, as shown in Fig. 3.

Figure 4:
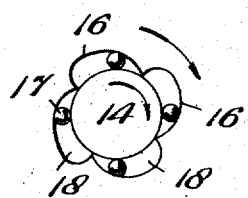
Fig. 4 is a conventional illustration of the clutch.

The vibrator consists of an oscillating shaft 14 having its ends respectively mounted in the bearing 10 and screw 12, and a striker in the form of a wheel 15 rotatably mounted on the shaft and connected therewith by a clutch. As illustrated, the wheel is provided in one face around its shaft-opening with a series of recesses having clutch surfaces 16 whose rear ends form pockets 18 for the free reception of the rolling clutch elements or balls 17 and whose forward ends in the direction of rotation approach the shaft so that the balls will be bound against it as seen in Fig. 4. The recesses for the balls are cut into the face of the wheel and are closed at their inner sides by a wall 19 in the wheel itself, whereas they are closed at their outer sides by a collar 20 carried by the shaft. As also illustrated herewith, the shaft carries a larger collar or disk 24 next outside of and rigid with the collar 20.

In order to reduce friction as far as possible, the wheel is also provided around its shaft-opening with a recess in its opposite face producing a ball-race 24 for a series of anti-friction bodies such as balls 22 which travel therein in contact with another ball-race on the shaft and a cone 23 also disposed upon said shaft, as usual in bearings of this type. This construction is preferred in order that the vibrating wheel may be uniformly balanced and it results that the wheel is free to revolve for a relatively long duration of time.

The disk 21 which is fixed to the shaft 14, is provided at one side with a horizontal crank pin 25 which is extended through an elongated slot 26 in a lateral lug 27 on the actuator. The latter is in the form of a plunger 28 freely movable through alined bearings 29 and 30 which are secured to the walls of the casing 1. At the outer end the plunger is provided with a knob 30' which may be operated by the hand of the user so as to cause its movement in one direction; whereas the plunger is moved automatically in an opposite direction under the action of a spring 31 which is mounted upon a suitable support 32 in the casing 1 and provided with a terminal 33 underlying the pin 25 and freely bearing thereagainst. The opposite terminal 34 of the spring bears against the adjacent wall of the casing 1.

The flexible diaphragm 3 is provided with an adjustable stud 35 which is centrally disposed upon the shaft 14. It may be moved with relation to the toothed knocking surface 36 of the vibrating wheel 15 in order that such vibrations of the diaphragm may be set up as will suit the requirements of the operator and also bring about an operative correlated position of the diaphragm and the wheel 15, as will be understood.

Coiled about the shaft 14 is a spring 37 having one terminal extended through and secured in a passage 38 in the shaft and its opposite terminal, secured at 39 to the bearing 10. Under the influence of this spring the shaft may be revolved in one direction for a purpose to be hereinafter explained.

Figure 2:
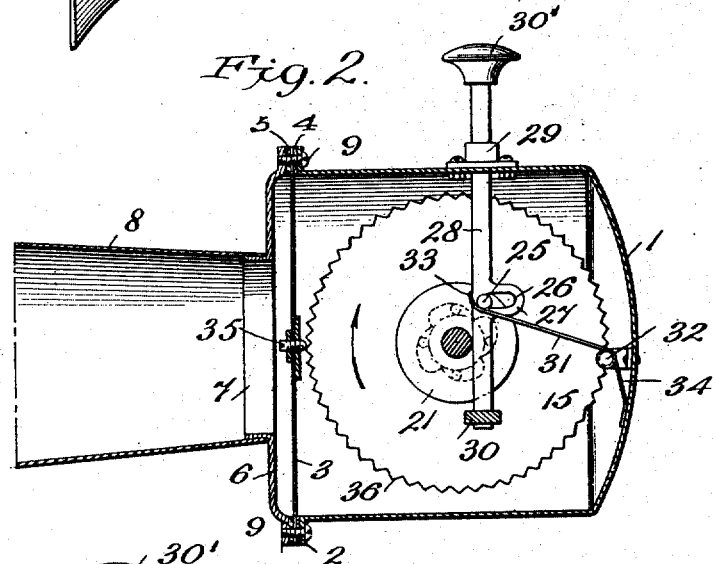
Fig. 2 is a vertical section therethrough.

In operation the plunger 28 which is tangentially disposed with relation to the shaft 14, is depressed against the action of the spring 31 and in so doing the pin 25 moves the disk 21 and motion is imparted to the shaft 14. By tapping the knob 30' suddenly best results are obtained as sudden motion will, of course, be imparted to the shaft and as a consequence thereof, the friction clutch bodies 17 will be made to travel forward and effectually brought into clutch contact with the shaft 14. On operating the device 28 in the mentioned manner, temporary forward rotation will be set up in the wheel 15, and on releasing pressure of the hand from the device 28, the latter will be returned to its normal position, shown in Figs. 2 and 3 and the spring 37 will reset the shaft 14. The clutch bodies 17 will thus return to the pockets 18, and the wheel 15 will continue to revolve by inertia for quite a duration of time. The construction permits of a means which will operate to permit respectively positive and non-positive rotary movements to be imparted to the wheel 15, and the latter's office as a vibrating means for the diaphragm will be materially added to and the diaphragm c... vibrated for a relatively long period c... me with but comparatively little exertion on the part of the operator.

The spring 37, operates to hold the shaft 14, normally under tension. It causes the shaft to quickly return to its normal stationary condition after motion is imparted to the controlling device 28, for the purpose of setting up active movements in the vibrating wheel 15.

While I have shown and described one principal embodiment of my invention by way of illustration, I wish it to be understood that I do not confine myself to all the precise details of construction herein set forth, as modifications, variations and alterations may be made therein without departing from the spirit of the invention or exceeding the scope of the appended claim.

What is claimed as new is:

In a signal of the class described including a casing having a diaphragm provided with a stud, the combination with a shaft mounted for oscillation within the casing, yielding means normally turning it in one direction, a collar and an adjacent disk fast on the shaft, a crank pin on the disk, an upright plunger movably mounted in the casing and having a cross slot engaging said pin, and a spring holding the plunger normally raised; of a striker wheel having knocking surfaces on its periphery coacting with said stud, the wheel having an axial opening surrounding said shaft and being recessed in its face next said collar to produce a series of clutch surfaces converging toward the shaft in the direction of rotation, clutch balls between the inner wall of the recesses and said collar, said wheel also having a recess in its opposite face producing a ball race around its shaft-opening, a series of balls in this race, and a cone on the shaft contacting with said balls.

In testimony whereof I affix my signature in presence of two witnesses.

JERARD R. MARSICO.

Witnesses:
STANLEY TOMMASELLE,
GEO. F. BYRNE.

Copies of this patent may be obtained for five cents each, by addressing the "Commissioner of Patents, Washington, D. C."